(12) United States Patent
Moore et al.

(10) Patent No.: US 11,872,652 B1
(45) Date of Patent: Jan. 16, 2024

(54) SHEATHED THERMITE ROD

(71) Applicant: Advanced Defense Components Inc., Walhalla, SC (US)

(72) Inventors: Jeremy Keith Moore, Walhalla, SC (US); James M. Behmke, Boston, MA (US)

(73) Assignee: ADVANCED DEFENSE COMPONENTS INC, Walhalla, SC (US)

( * ) Notice: Subject to any disclaimer, the term of this patent is extended or adjusted under 35 U.S.C. 154(b) by 0 days.

(21) Appl. No.: 17/873,090

(22) Filed: Jul. 25, 2022

Related U.S. Application Data

(60) Provisional application No. 63/224,908, filed on Jul. 23, 2021, provisional application No. 63/224,933, filed on Jul. 23, 2021.

(51) Int. Cl.
*B23K 23/00* (2006.01)
*B23K 35/02* (2006.01)

(52) U.S. Cl.
CPC .......... *B23K 23/00* (2013.01); *B23K 35/0216* (2013.01); *B23K 35/0272* (2013.01)

(58) Field of Classification Search
CPC B23K 23/00; B23K 35/0216; B23K 35/0272; B23K 1/006
USPC ...................................................... 228/234.3
See application file for complete search history.

(56) References Cited

U.S. PATENT DOCUMENTS

| | | | | |
|---|---|---|---|---|
| 3,168,090 A | * | 2/1965 | Billhardt | B23K 23/00 126/263.01 |
| 4,391,209 A | * | 7/1983 | Moore | E21B 7/146 266/225 |
| 4,660,807 A | * | 4/1987 | Campana | B23K 35/0216 219/69.15 |
| 7,946,466 B1 | * | 5/2011 | Lofton | B23K 23/00 228/234.3 |

(Continued)

FOREIGN PATENT DOCUMENTS

| | | | | |
|---|---|---|---|---|
| CA | 3037485 A1 | * | 3/2018 | A62B 7/02 |
| CA | 3008303 A1 | * | 12/2018 | B23K 23/00 |

(Continued)

OTHER PUBLICATIONS

Machine translation of RU-2206437-C1 (no date available).*

*Primary Examiner* — Kiley S Stoner
(74) *Attorney, Agent, or Firm* — BEHMKE INNOVATION GROUP LLC; James M. Behmke; Keith Olinga Mitchell

(57) ABSTRACT

In one embodiment, sheathed thermite rods are provided. For instance, a sheathed thermite rod may comprise a mixture of thermite within an outer casing, such as an aluminum tube, that adds rigidity and allows for better continuity of a burn across breaks in the thermite rod. The sheathing also allows for manufacture of the thermite rods to have reduced drying period, increasing speed of production. In another embodiment, tablet-based thermite rods are provided. A thermite tablet rod herein may comprise a series of inline thermite tablets contained within an outer casing. The tablets may be consecutively adjacent to one another along the length of the outer casing, and substantially conforming to the interior cross section of the outer casing, where the tablets are adjoined by pressure, an adhesive, and/or a burn continuance material.

20 Claims, 11 Drawing Sheets

(56) References Cited

U.S. PATENT DOCUMENTS

| | | | | |
|---|---|---|---|---|
| 10,155,275 | B2 * | 12/2018 | Hansen | B23K 7/08 |
| 2004/0004060 | A1 * | 1/2004 | Wolfe | B23K 35/0216 |
| | | | | 219/70 |
| 2005/0230076 | A1 * | 10/2005 | Gregory | B23K 23/00 |
| | | | | 249/86 |
| 2011/0132967 | A1 * | 6/2011 | Lofton | B23K 23/00 |
| | | | | 228/33 |
| 2017/0066087 | A1 * | 3/2017 | Hansen | B23K 7/005 |
| 2017/0232539 | A1 * | 8/2017 | Hansen | B23K 35/0216 |
| | | | | 266/75 |
| 2018/0085850 | A1 * | 3/2018 | Huang | C06B 33/00 |
| 2019/0210160 | A1 * | 7/2019 | Hansen | B23K 35/228 |
| 2021/0039193 | A1 * | 2/2021 | Huang | E21B 33/12 |

FOREIGN PATENT DOCUMENTS

| | | | | | |
|---|---|---|---|---|---|
| CN | 107702143 | A | * | 2/2018 | |
| CN | 110280892 | A | * | 9/2019 | |
| EP | 0067349 | A1 | * | 12/1982 | |
| RU | 1833272 | A3 | * | 8/1993 | |
| RU | 2139174 | C1 | * | 10/1999 | |
| RU | 2206437 | C1 | * | 6/2003 | |
| RU | 167785 | U1 | * | 1/2017 | |
| WO | WO-2008113653 | A1 | * | 9/2008 | B23K 23/00 |
| WO | WO-2013130750 | A2 | * | 9/2013 | B23K 35/0211 |
| WO | WO-2018053471 | A1 | * | 3/2018 | A62B 7/02 |

* cited by examiner

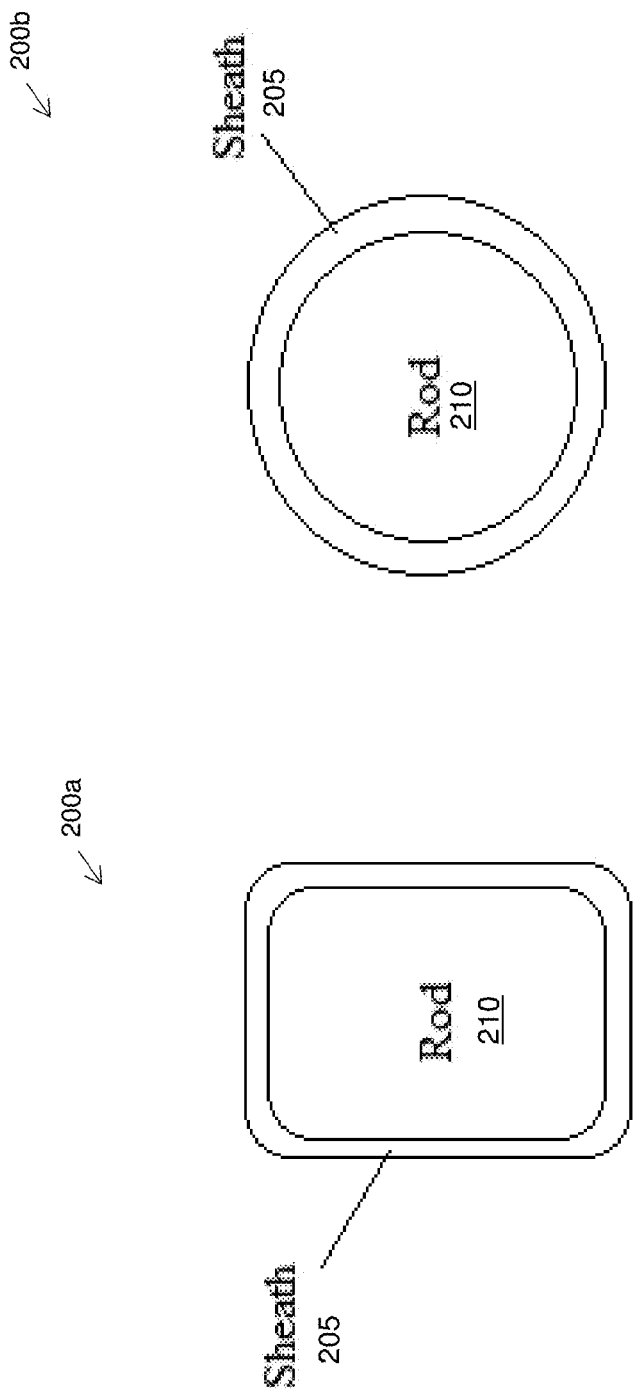

SHEATHED THERMITE ROD

RELATED APPLICATIONS

This application claims priority to the following U.S. Provisional Applications, the contents of each of which being incorporated herein by reference:

U.S. Prov. Appl. Ser. No. 63/224,933, filed on Jul. 23, 2021, entitled SHEATHED THERMITE ROD, by Moore, et al.

U.S. Prov. Appl. Ser. No. 63/224,908, filed on Jul. 23, 2021, entitled THERMITE ROD BURN LIGHT COVER, by Moore, et al.

TECHNICAL FIELD

The present disclosure relates generally to thermite-based tools and associated uses and accessories, and, more particularly, to sheathed thermite rods and tablet-based thermite rods.

BACKGROUND

Thermite is a non-explosive formulation consisting of metals and metal oxides that cause high-temperature exothermic reaction, often used for welding, cutting, melting, surfacing, casting, destroying, and so on. Many variants of thermite formulations have been developed for specific uses over time, each with specific qualities (e.g., temperatures, ignitability, safety, rigidity, longevity, combustion sustainability, etc.).

Thermite compositions consist generally of a mixture of a finely divided, strongly reducible metal oxide (e.g., iron/ferrous oxide or others, such as copper/cupric oxide, nickel oxide, etc.), and a finely divided strong reducing agent (e.g., aluminum, silicon, magnesium, etc.). Other materials, including other metals, binders (e.g., polyvinyl alcohol), and so on, may also be added, depending on the particular desired use and outcome.

Once ignited, the thermite compositions react highly exothermically, thereby raising the temperature of the products to around 3000° C. The heat from the reaction is used for various purposes, such as destruction of military targets and munitions, incendiary weapons, cutting and welding torches, igniters for other reactions such as activation of air bags, plating of metals upon substrates, cutting or plugging oil well conduits, and the like.

One typical example configuration of a handheld portable thermite tool comprises an elongated pressed rod made from a thermite composition, often called a thermite pen, thermite pencil, thermite torch, thermite lance, and so on, typically having a cross-section that is close to rectangular, with rounded corners, or generally circular. Such handheld tools may be used for emergency and rescue work, construction assembly and dismantling, repair of structures and machinery, law enforcement or military applications, and so on, particularly in any location regardless of the presence of any available power sources. That is, such thermite rods produce flame temperatures high enough to melt (e.g., cut) products made of steel, non-ferrous metals, glass, composite materials, and other hard materials, while still being compact and portable, and having strength characteristics sufficient for its transportation and use.

One issue with thermite-based tools, particularly thermite rods, is their fragility, both in terms of adverse effects during transportation and operation (e.g., shock, etc.), as well as general exposure to the elements (e.g., humidity, moisture, etc.). Another issue with thermite-based tools, particularly thermite rods, is that they are difficult to manufacture.

SUMMARY

According to one or more embodiments of the disclosure, devices, systems, and techniques introduced herein relate to thermite-based tools and associated uses and accessories. In particular, as described herein, the present disclosure is directed to sheaths for thermite rods, and the manufacture of thermite rods.

Specifically, according to the present disclosure, embodiments herein provide for sheathed thermite rods. For instance, in one embodiment, a sheathed thermite rod may comprise a mixture of thermite within an outer casing, such as an aluminum tube, that adds rigidity and allows for better continuity of a burn across breaks in the thermite rod. The sheathing also allows for manufacture of the thermite rods to have reduced (e.g., no) drying period, increasing speed of production. In one embodiment, the sheath may be threaded at one end for attachment to one or more accessories, or for serial connection to additional sheathed thermite rods.

According to additional embodiments of the present disclosure, embodiments herein provide for tablet-based thermite rods. For instance, a thermite tablet rod herein may comprise a series of inline thermite tablets contained within an outer casing, such as an aluminum tube. The tablets may be consecutively adjacent to one another along the length of the outer casing, and substantially conforming to the interior cross section of the outer casing (e.g., circular, oval, oblong, rectangular, etc.), where the tablets are adjoined by pressure, an adhesive, and/or a burn continuance material. In this manner, the embodiments herein form a linearly contiguous thermite rod using thermite tablets, which are generally easier to manufacture than solid rods of thermite. In one embodiment, the tablets are substantially identical in formulation. In another embodiment, the tablets may have different compositions, such as for various ignition temperatures, burn temperatures, colors (e.g., to indicate successful ignition, temperature, nearing the end of the rod, etc.), and so on. In still another embodiment herein, the tablets may have one or more physical features, such as through-holes (e.g., for passage of oxygen, brazing rods for welding, etc.), interconnecting/interlocking designs, and other useful shapes.

Still further embodiments herein provide for a thermite rod burn light cover. For instance, a thermite rod burn light cover may comprise an elongated tubular structure that attaches to the thermite rod (e.g., the rod itself or a holder/handle of the rod) as an outer sheath, and either burns away with the thermite reaction, or else in one embodiment is configured to slide backwards at its attachment point (e.g., being pushed along the holder/handle of the rod) while the thermite rod is burned and decreases in length. In this manner, the burn light cover may stay consistently over the burn location of the thermite rod during the burn (i.e., against the surface to which the burning thermite is being placed).

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 1 and 2A-2B illustrate examples of sheathed thermite rods in accordance with one or more embodiments of the present disclosure.

DESCRIPTION OF EXAMPLE EMBODIMENTS

As noted above, one issue with thermite-based tools, particularly thermite rods, is their fragility, both in terms of adverse effects during transportation and operation (e.g., shock, etc.), as well as general exposure to the elements (e.g., humidity, moisture, etc.). Prior techniques make use of a thin film/shell of combustible material that seals the thermite core, protecting it from moisture, and, depending on the binder used in the manufacture of the pressed rod, allowing the thermite mixture to remain flexible. However, such thin films are not suitable for rugged use and transportation, and provide no further functionality to the rod.

According to one or more embodiments of the disclosure, therefore, one or more embodiments of improved thermite rod sheathing are provided.

Figure 1:
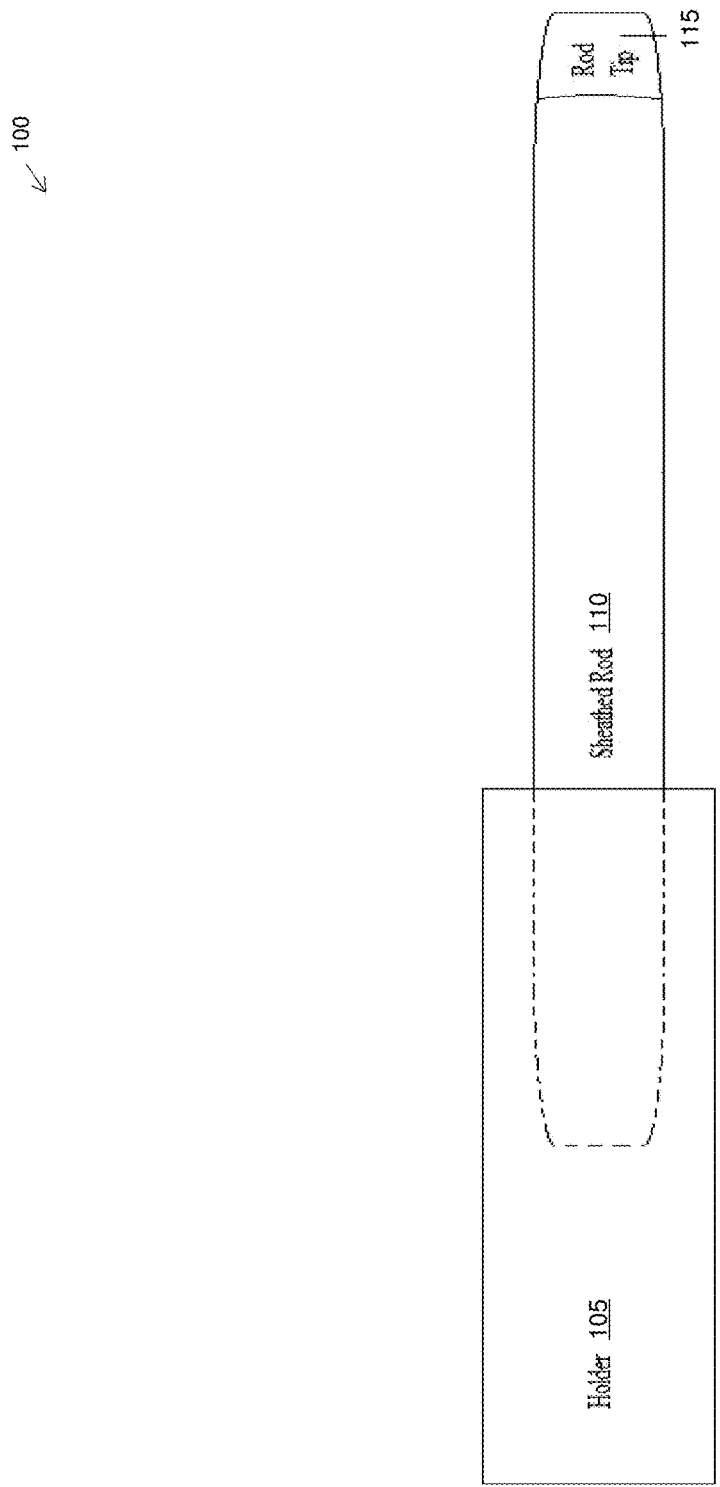

Specifically, according to the present disclosure, embodiments herein provide for sheathed thermite rods. For instance, as shown in FIG. 1, a sheathed thermite rod 100 may comprise a sheathed rod portion 110, a rod tip 115 (e.g., exposed portion), and a holder 105. As also shown in FIGS. 2A-2B, a cross section of a sheathed thermite rod 200*a* (generally rectangular) and 200*b* (generally circular) may comprise a mixture of thermite 210 (e.g., rod) within an outer casing or sheath 205, such as an aluminum tube, that adds rigidity and allows for better continuity of a burn across breaks in the thermite rod. The sheathing also allows for manufacture of the thermite rods to have reduced (e.g., no) drying period, increasing speed of production. In one embodiment, the sheath may be threaded at one end for attachment to one or more accessories, or for serial connection to additional sheathed thermite rods.

Note that the sheath/sleeve may also create less smoke, may act as an additional fuel, provide slag, etc. The composition of the sheath may also be other materials, such as tin, or composites. Certain materials may be used within the sheath, such as aluminum-based epoxy, to fill any gaps between the sheath and the thermite rods.

Advantageously, the techniques above particularly provide sheathed thermite rods. In particular, the present disclosure provides increased protection, rigidity, and functionality over conventional thermite rods.

As also noted above, one issue with thermite-based tools, particularly thermite rods, is that they are difficult to manufacture, and also often suffer from their fragility, both in terms of adverse effects during transportation and operation (e.g., shock, etc.), as well as general exposure to the elements (e.g., humidity, moisture, etc.).

According to one or more embodiments of the disclosure, therefore, one or more embodiments of tablet-based thermite rods are provided.

Figure 3A:
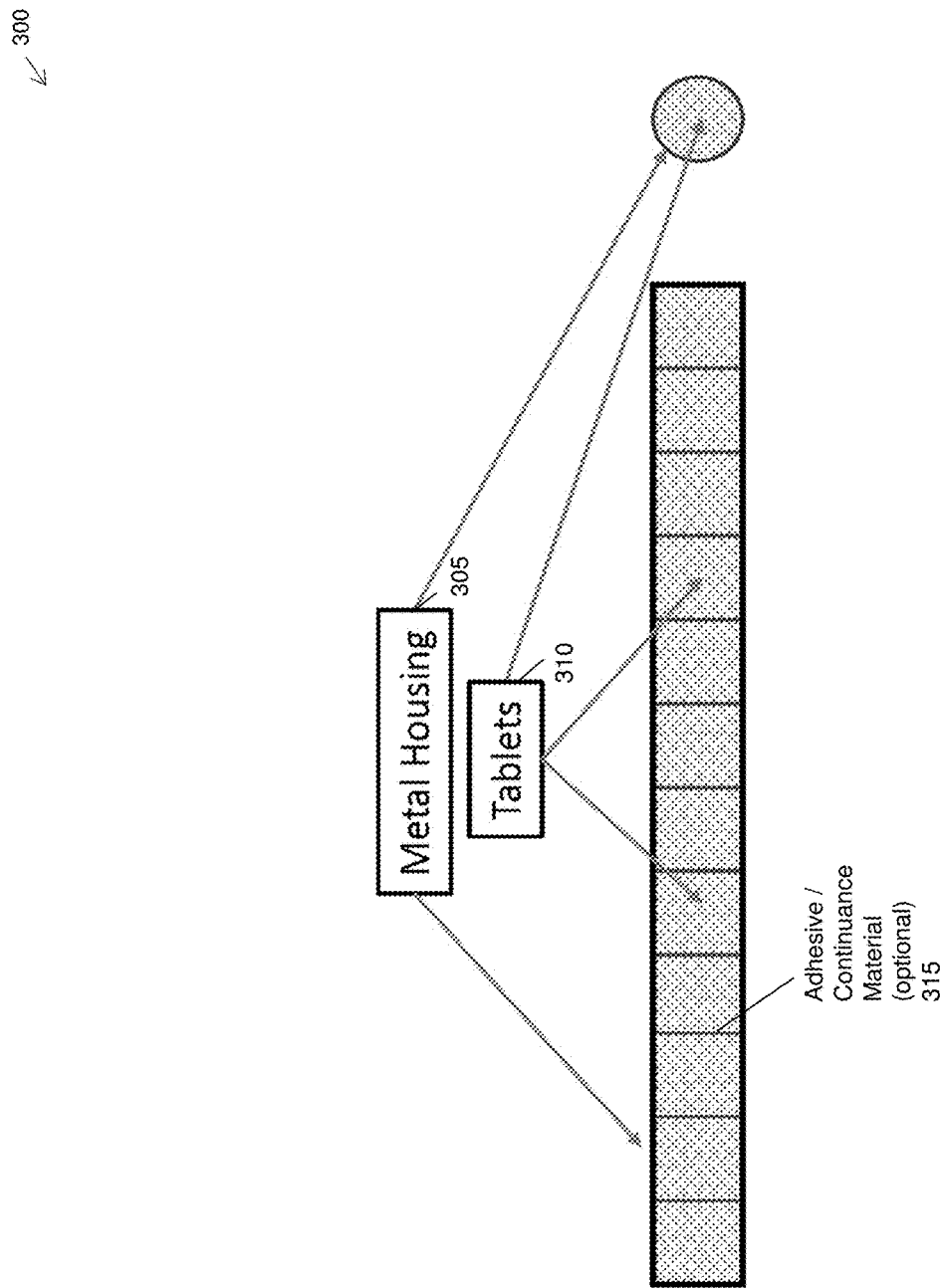
FIGS. 3A-3C illustrate examples of tablet-based thermite rods in accordance with one or more embodiments of the present disclosure.
Figure 3B:
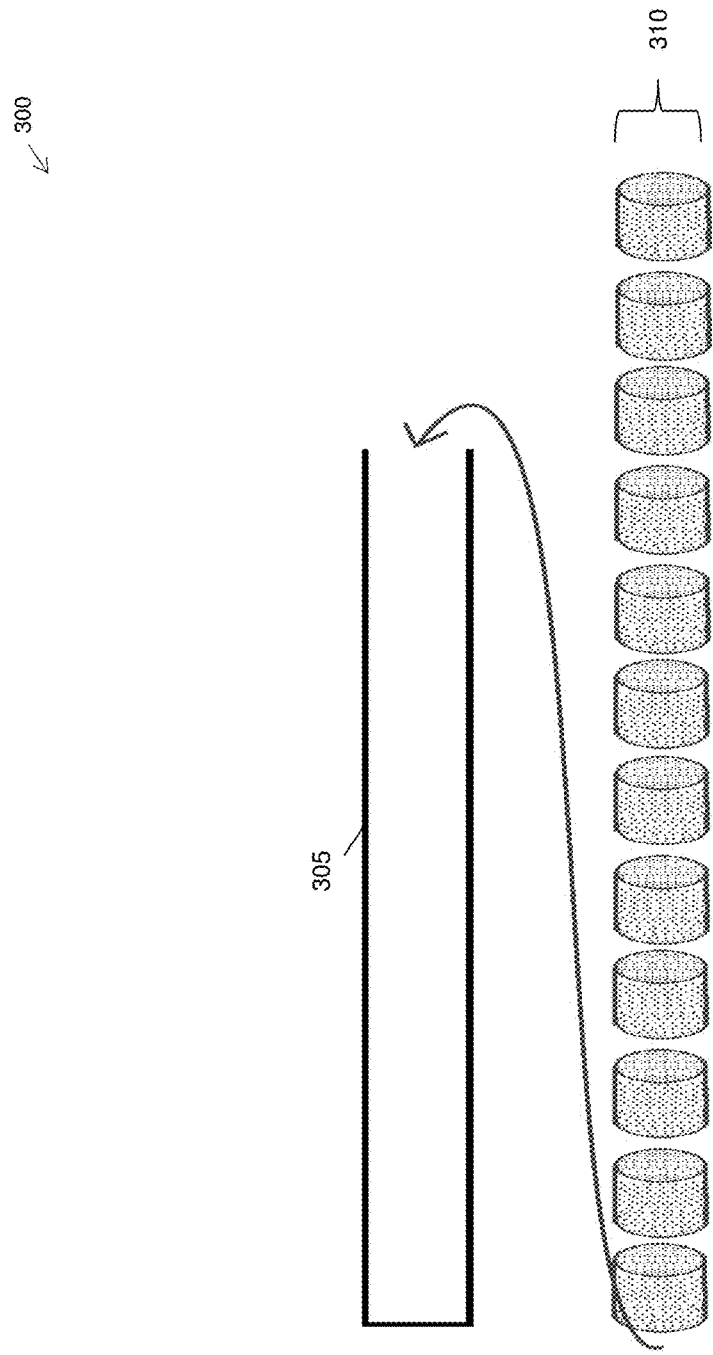
Figure 3C:
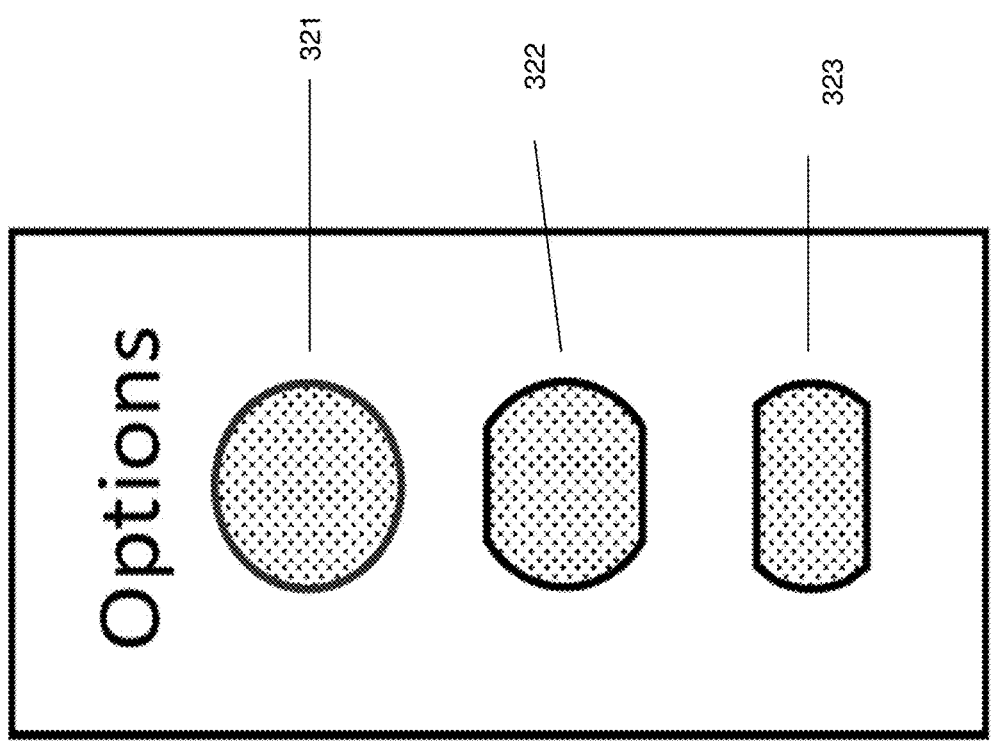

According to the particular embodiments herein, and with specific reference to FIGS. 3A-3C, a thermite tablet rod 300 herein may comprise a series of inline thermite tablets 310 contained within an outer casing (sheathing) 305 (aka "metal housing"), such as an aluminum tube. The tablets may be consecutively adjacent to one another along the length of the outer casing, and substantially conforming to the interior cross section of the outer casing (e.g., circular, oval, oblong, rectangular, etc.), where the tablets are adjoined by pressure, or optionally a continuance material 315 (an adhesive and/or a burn continuance material) such as aluminum-based epoxy, to fill any gaps between the thermite tablets. FIG. 3B illustrates how the tablets 310 may be inserted into the casing/sheath 305, while FIG. 3C illustrates example options for cross sections (321, 322, and 323), such as circular or otherwise, though any cross sectional shape may be used.

In this manner, the embodiments herein form a linearly contiguous thermite rod using thermite tablets, which are generally easier to manufacture than solid rods of thermite. In one embodiment, the tablets are substantially identical in formulation. In another embodiment, the tablets may have different compositions, such as for various ignition temperatures, burn temperatures (e.g., increasing, decreasing, alternating, etc.), colors (e.g., to indicate successful ignition, temperature, midpoint of the rod, nearing the end of the rod, etc.), and so on.

Figure 4A:
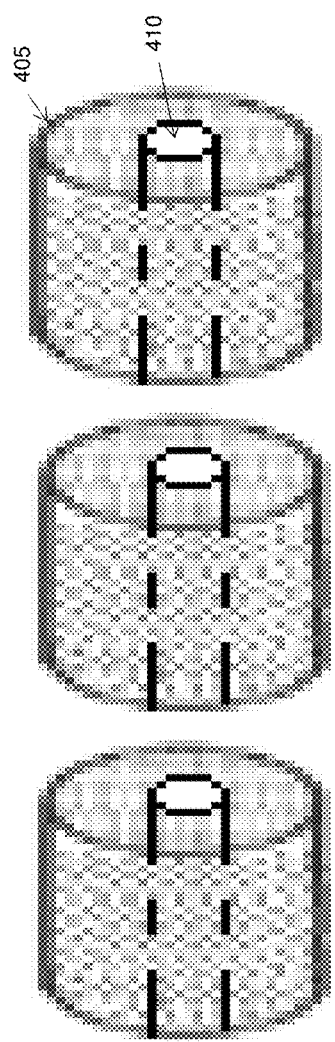
FIGS. 4A-4B illustrate examples of physical tablet features of tablet-based thermite rods in accordance with one or more embodiments of the present disclosure.
Figure 4B:
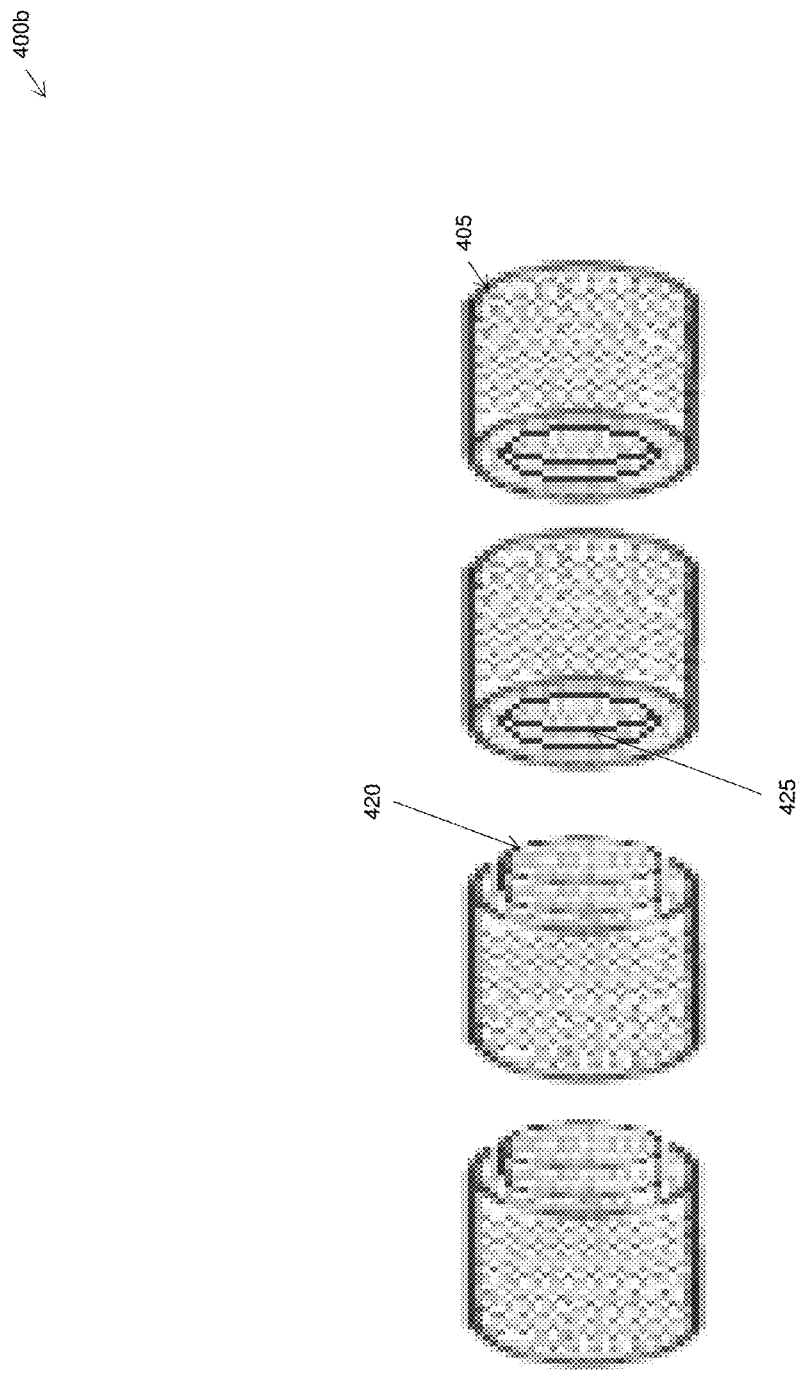

In still another embodiment herein, the tablets may have one or more physical features, such as through-holes (apertures 410) as in the tablets 405 of the illustration 400*a* FIG. 4A (e.g., for passage of oxygen, brazing rods for welding, etc.), interconnecting/interlocking designs (with inserts 420 and detents 425, for example) as in example 400*b* FIG. 4B (among any possible configuration of interlocking designs), and other useful shapes.

As also noted above, one issue with thermite-based tools is that they are difficult to extinguish. That is, once they are ignited, typically the entire supply of thermite (e.g., the entire rod) is expected to fully burn out, which may range from being merely wasteful to being completely unsafe.

Figure 5:
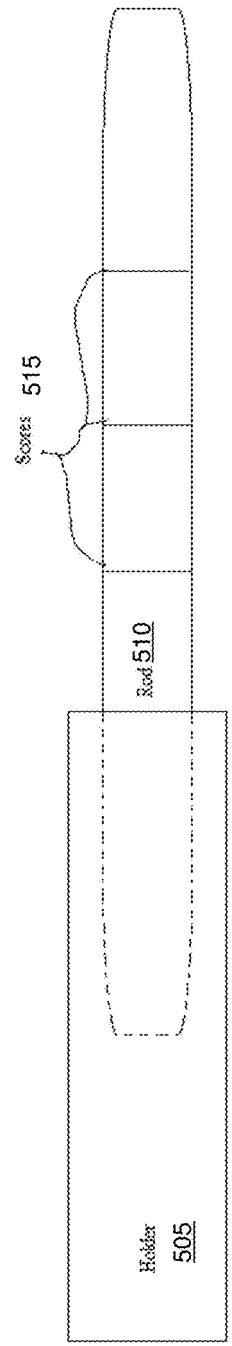
FIG. 5 illustrates an example of a scored outer casing for burn stoppage of tablet-based thermite rods in accordance with one or more embodiments of the present disclosure.

According to one or more embodiments of the disclosure, therefore, one or more embodiments of improved thermite rod burn stoppage are provided. For instance, as shown in example 500 of FIG. 5, the thermite rod 510 (e.g., solid rod or tablet-based) may have separations between tablets or else scores 515 formed along the length of the rod, such that lateral force against the thermite rod, particularly during a burn, may separate a currently ignited end (e.g., tablet) away from the outer sheathing, stopping continued burning of the remining thermite rod. In another embodiment, the outer sheathing may itself have one or more scores 515 in it to facilitate breaking of the sheathing itself in a number of locations, allowing separation of unignited thermite (rod or tablets) from the portion of the rod currently burning.

Other embodiments conceived of herein involve ejection mechanisms to press the burning tablets out of the outer sheath to leave only unignited tablets within the sheath, accordingly.

Advantageously, the techniques herein thus also provide tablet-based thermite rods. In particular, the present disclosure provides easier manufacturing of thermite tablets (as compared to solid rods), while also providing increased protection, rigidity, and functionality over conventional thermite rods.

Notably, an additional issue with thermite-based tools is that they are particularly bright during their use, as the intense chemical reaction produces a significant amount of light. This is problematic for eye safety as well as for covert operations.

According to one or more embodiments of the disclosure, therefore, one or more embodiments of a thermite rod burn light cover (aka "outer sheath") are provided.

Figure 6:
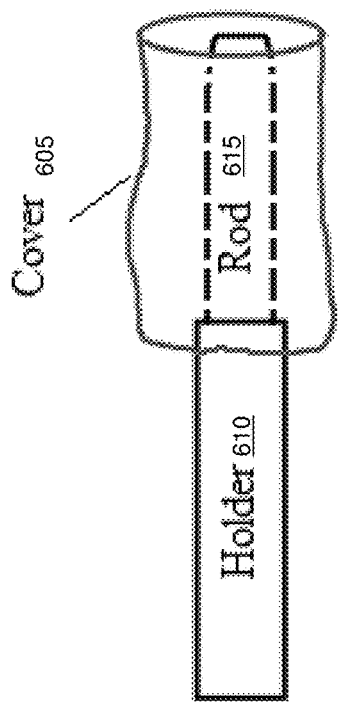
FIGS. 6 and 7A-7B illustrate examples of a thermite rod burn light cover in accordance with one or more embodiments of the present disclosure.
Figure 7A:
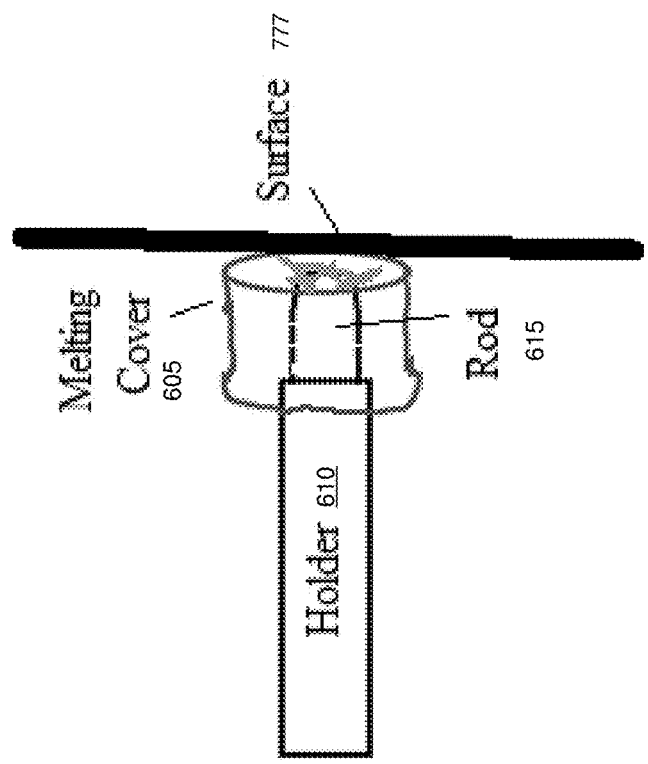
Figure 7B:
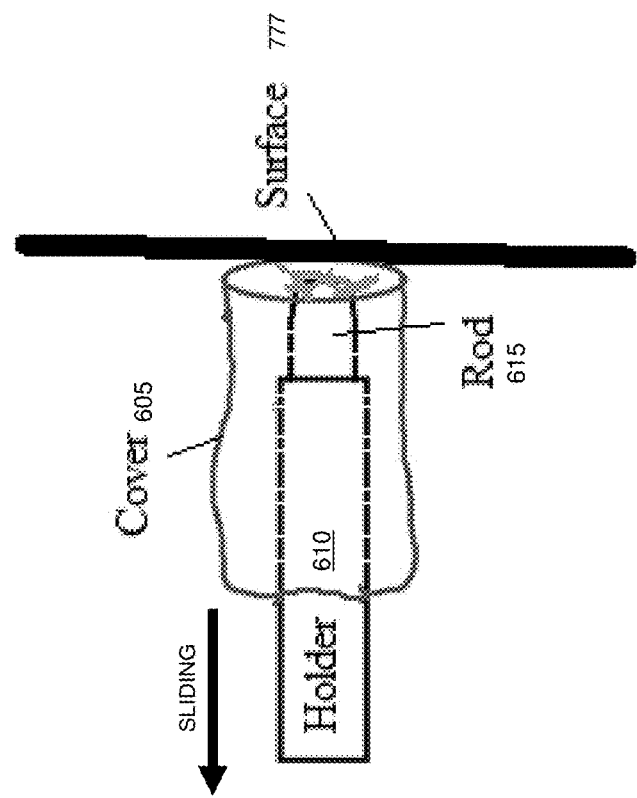

Specifically, according to the present disclosure, embodiments herein provide for a thermite rod burn light cover. For instance, with reference to example 600 of FIG. 6, a thermite rod burn light cover 605 may comprise an elongated tubular structure that attaches to the thermite rod 615 (e.g., the rod itself or a holder/handle 610 of the rod) as an outer sheath, and either burns away with the thermite reaction (example 700a FIG. 7A), such as against a surface 777, or else in one embodiment is configured to slide backwards at its attachment point (e.g., being pushed along the holder/handle of the rod) while the thermite rod is burned and decreases in length (example 700b of FIG. 7B). In this manner, the burn light cover 605 may stay consistently over the burn location of the thermite rod during the burn (i.e., against the surface 777 to which the burning thermite is being placed).

Advantageously, the techniques herein also provide a thermite rod burn light cover as an outer sheath. In particular, the present disclosure provides for a cover to the bright burn of thermite, such as for eye protection and/or covert operations.

As described above, an example sheathed thermite rod herein may comprise: a length of thermite having a thermite burn temperature; a rigid sheath substantially surrounding and adjacent to the length of thermite, the rigid sheath having a melting temperature that is lower than the thermite burn temperature; and a handle located at and surrounding a first end of the length of thermite, wherein a second end of the length of thermite is exposed from the rigid sheath for igniting the second end of the length of thermite.

In one embodiment, the rigid sheath comprises one or more of aluminum, tin, and composite materials. In one embodiment, the sheathed thermite rod further comprises: an aluminum-based epoxy disposed between the length of thermite and the rigid sheath. In one embodiment, the length of thermite comprises a generally consistent thermite rod. In one embodiment, the length of thermite comprises a plurality of thermite tablets. In one embodiment, the plurality of thermite tablets are adjoined by a continuance material. In one embodiment, the continuance material comprises an aluminum-based epoxy. In one embodiment, the plurality of thermite tablets are substantially identical in formulation. In one embodiment, the plurality of thermite tablets consist of a plurality of different compositions. In one embodiment, the plurality of different compositions comprise different ignition temperatures. In one embodiment, the plurality of different compositions comprise different burn temperatures. In one embodiment, the plurality of different compositions comprise different burn colors. In one embodiment, the plurality of thermite tablets comprise one or more aligning length-wise apertures. In one embodiment, the one or more aligning length-wise apertures provide passage of one or more gasses through the length of thermite. In one embodiment, the plurality of thermite tablets comprise one or more interconnecting features. In one embodiment, the rigid sheath comprises one or more features to facilitate breaking of the rigid sheath. In one embodiment, the sheathed thermite rod further comprises: an outer sheath substantially surrounding the rigid sheath, wherein a gap is formed between the outer sheath and the rigid sheath, and wherein the outer sheath hides burn light from the length of thermite as it burns. In one embodiment, the outer sheath burns along with the rigid sheath. In one embodiment, the outer sheath slides along the rigid sheath during burning of the rigid sheath. In one embodiment, the length of thermite comprises a cutting thermite rod.

While the present disclosure has illustrated various embodiments and specific implementations, other configurations may be made within the scope of the invention. For instance, while certain materials may have been shown for each component, other suitable materials may be used. Furthermore, while certain shapes or designs of the components have been shown and described, functionally similar designs may also be utilized herein. Moreover, while components of the present disclosure may be described separately and in separate figures, certain components from each embodiment may be incorporated into each other embodiment, and the components shown in each of the illustrations are not meant to be mutually exclusive. That is, various combinations of components may be made with the scope of the present disclosure by combining the described components in useful manners.

In addition, it is well known in the art that by adjusting parameters such as blend ratios, density, particle size, and forming techniques, the composition of thermite may be modified in terms of burn rate and heat transfer intensity. For example, the exothermic reaction proceeds at a slower rate as composition density is increased. Heat transfer rate is slower where lesser thermally conductive compounds are used. While the invention is intended primarily for a relatively slow burn rate, it is envisioned that the invention may be used in faster burn rates (e.g., explosive applications).

It should also be noted that any steps shown and/or described in any procedure(s) or discussions above are merely examples for illustration, and certain other steps may be included or excluded as desired. Further, while a particular order of the steps may have been discussed and/or shown, this ordering is merely illustrative, and any suitable arrangement of the steps may be utilized without departing from the scope of the embodiments herein.

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A sheathed thermite rod, comprising:
   a length of thermite having a thermite burn temperature;
   a rigid sheath substantially surrounding and adjacent to the length of thermite, the rigid sheath having a melting temperature that is lower than the thermite burn temperature;
   a handle located at and surrounding a first end of the length of thermite, wherein a second end of the length of thermite is exposed from the rigid sheath for igniting the second end of the length of thermite; and
   an aluminum-based epoxy disposed between the length of thermite and the rigid sheath.

2. The sheathed thermite rod as in claim 1, wherein the rigid sheath comprises one or more of aluminum, tin, and composite materials.

3. The sheathed thermite rod as in claim 1, wherein the length of thermite comprises a generally consistent thermite rod.

4. A sheathed thermite rod, comprising:
a length of thermite having a thermite burn temperature;
a rigid sheath substantially surrounding and adjacent to the length of thermite, the rigid sheath having a melting temperature that is lower than the thermite burn temperature; and
a handle located at and surrounding a first end of the length of thermite, wherein a second end of the length of thermite is exposed from the rigid sheath for igniting the second end of the length of thermite;
wherein the length of thermite comprises a plurality of thermite tablets.

5. The sheathed thermite rod as in claim 4, wherein the plurality of thermite tablets are adjoined by a continuance material.

6. The sheathed thermite rod as in claim 5, wherein the continuance material comprises an aluminum-based epoxy.

7. The sheathed thermite rod as in claim 4, wherein the plurality of thermite tablets are substantially identical in formulation.

8. The sheathed thermite rod as in claim 4, wherein the plurality of thermite tablets consist of a plurality of different compositions.

9. The sheathed thermite rod as in claim 8, wherein the plurality of different compositions comprise different ignition temperatures.

10. The sheathed thermite rod as in claim 8, wherein the plurality of different compositions comprise different burn temperatures.

11. The sheathed thermite rod as in claim 8, wherein the plurality of different compositions comprise different burn colors.

12. The sheathed thermite rod as in claim 4, wherein the plurality of thermite tablets comprise one or more aligning length-wise apertures.

13. The sheathed thermite rod as in claim 12, wherein the one or more aligning length-wise apertures provide passage of one or more gasses through the length of thermite.

14. The sheathed thermite rod as in claim/wherein the plurality of thermite tablets comprise one or more interconnecting features.

15. The sheathed thermite rod as in claim 4, wherein the rigid sheath comprises one or more features to facilitate breaking of the rigid sheath.

16. A sheathed thermite rod, comprising:
a length of thermite having a thermite burn temperature;
a rigid sheath substantially surrounding and adjacent to the length of thermite, the rigid sheath having a melting temperature that is lower than the thermite burn temperature;
a handle located at and surrounding a first end of the length of thermite, wherein a second end of the length of thermite is exposed from the rigid sheath for igniting the second end of the length of thermite; and
an outer sheath comprising an elongated tubular structure substantially surrounding the rigid sheath, wherein a gap is formed between the outer sheath and the rigid sheath, and wherein the outer sheath stays consistently over a burn location of the thermite so as to hide burn light from the length of thermite as it burns.

17. A sheathed thermite rod, comprising:
a length of thermite having a thermite burn temperature;
a rigid sheath substantially surrounding and adjacent to the length of thermite, the rigid sheath having a melting temperature that is lower than the thermite burn temperature;
a handle located at and surrounding a first end of the length of thermite, wherein a second end of the length of thermite is exposed from the rigid sheath for igniting the second end of the length of thermite; and
an outer sheath substantially surrounding the rigid sheath, wherein a gap is formed between the outer sheath and the rigid sheath, and wherein the outer sheath hides burn light from the length of thermite as it burns;
wherein the outer sheath slides along the rigid sheath during burning of the rigid sheath.

18. The sheathed thermite rod as in claim 4, wherein the length of thermite comprises a cutting thermite rod.

19. The sheathed thermite rod as in claim 4, further comprising:
an aluminum-based epoxy disposed between the length of thermite and the rigid sheath.

20. The sheathed thermite rod as in claim 4, wherein the rigid sheath comprises one or more of aluminum, tin, and composite materials.

* * * * *